United States Patent [19]

Sanchez

[11] 4,449,127
[45] May 15, 1984

[54] SYSTEM AND METHOD FOR TRACKING TARGETS IN A MULTIPATH ENVIRONMENT

[75] Inventor: José A. Sanchez, Pasadena, Md.

[73] Assignee: Westinghouse Electric Corp., Pittsburgh, Pa.

[21] Appl. No.: 242,514

[22] Filed: Mar. 10, 1981

[51] Int. Cl.³ ............................................. G01S 13/44
[52] U.S. Cl. .................................. 343/7 A; 343/16 M
[58] Field of Search .................... 343/7 A, 7.4, 5 NQ, 343/16 R, 16 M

[56] References Cited

U.S. PATENT DOCUMENTS

| | | | |
|---|---|---|---|
| 2,717,380 | 9/1955 | Brooks, Jr. | 343/16 M X |
| 3,757,326 | 9/1973 | White | 343/16 M X |
| 3,827,049 | 7/1974 | van Staaden et al. | 343/16 M X |
| 3,906,495 | 9/1975 | Roger | 343/16 M X |
| 4,163,975 | 8/1979 | Guilhem et al. | 343/5 NQ X |

*Primary Examiner*—T. H. Tubbesing
*Attorney, Agent, or Firm*—R. M. Trepp

[57] ABSTRACT

A method and apparatus is described for determining the presence of multipath conditions when tracking a target with a radar wherein the radar includes apparatus for transmitting signals and receiving target reflected signals along two boresight reference lines angularly displaced less than one beamwidth and means for processing the target reflected signals along both boresight reference lines to provide an elevation estimate of the target by target reflected signals along both boresight reference lines and to derive the quadrature component, if any, along both boresight reference line axes. A difference in target elevation derived from target reflected signals along both boresight reference lines or the presence of a quadrature component along one or both boresight reference lines is used to determine the presence of multipath conditions and to provide signals to select one of the elevation signals for tracking or to provide an estimate of target position. The selected elevation signal may be filtered and may have a correction factor added to it.

54 Claims, 15 Drawing Figures

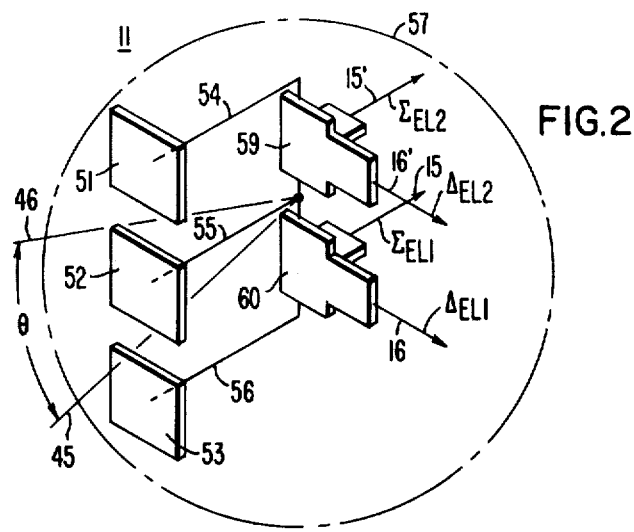
FIG.2
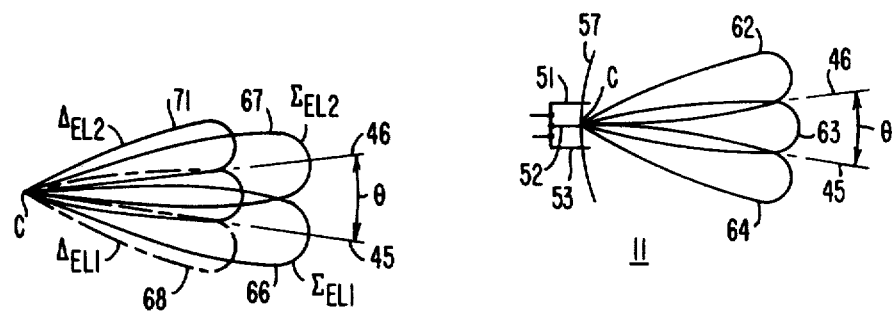
FIG.3
FIG.4
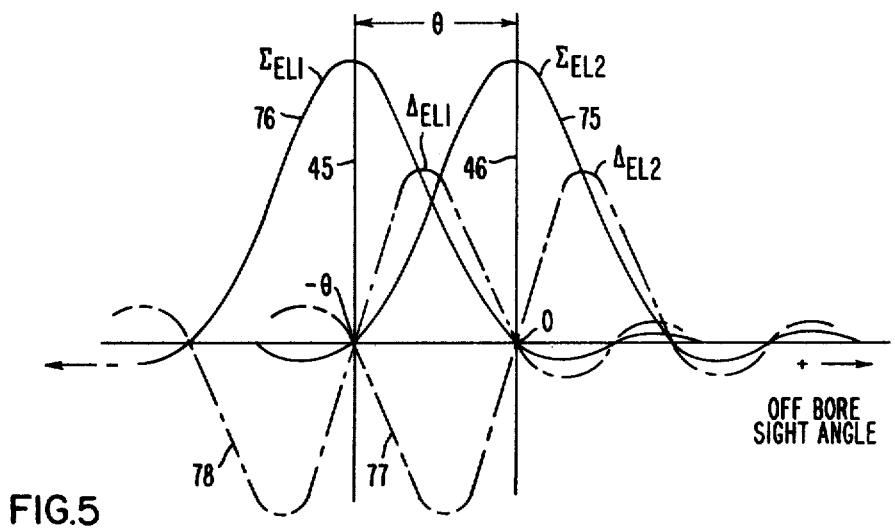
FIG.5

FIG.12
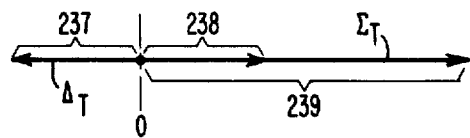
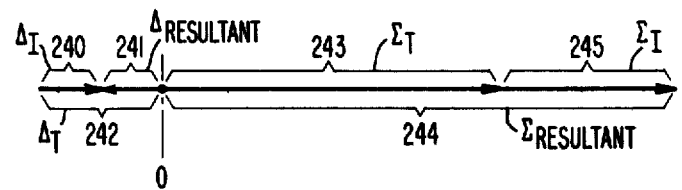
FIG.13
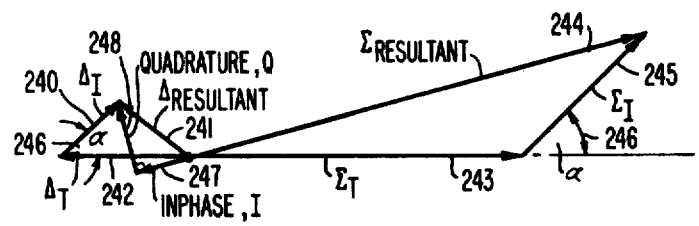
FIG.14

SYSTEM AND METHOD FOR TRACKING TARGETS IN A MULTIPATH ENVIRONMENT

BACKGROUND OF THE INVENTION

1. Field of the Invention

The present invention relates to radar, and more particularly, to a system and method for determining the presence of multipath conditions and determining the position of and the tracking of targets in the presence of multipath conditions.

2. Description of Prior Art

When detecting and tracking an object or target by radar, there are times when target reflected signals travel two different paths between antenna and target.

One path will be a straight line and the other path will involve the reflection of target signals off the ground or water at shallow grazing angles. The radar antenna may receive both signals in the main receiving beam of the antenna. When a radar is receiving signals under multipath conditions, the radar will track an apparent target signal at an elevation position determined by the composite signal of the target and image signals.

Heretofore, several methods and systems have been devised or proposed to eliminate the problem of tracking targets in a multipath environment. For example in U.S. Pat. No. 3,097,356 issued on July 9, 1963, a system is shown wherein the width of the radar beam is narrowed to produce an area responsive to targets of only 0.2 degrees angular width. However, within this target area, the multipath problems persist. In addition, the tracking lag, where the actual antenna position lags behind the target position due to inertia and other delays in the radar control system, must be considerably reduced in order to track the target.

U.S. Pat. No. 3,197,776 issued on July 27, 1965 minimizes the effect of echoes received from the ground by using a monopulse radar with typical monopulse target annular error detection capability disposed in the vertical plane. The echoes received from below the center of the antenna beam will be received by the monopulse antenna producing one polarity of signal, while the echoes received from above the center of the antenna beam will produce an opposite polarity signal. The radar described in U.S. Pat. No. 3,197,776 is responsive only to the polarity of the signal corresponding to echoes received above the center axis of the antenna beam; thus, the effect of ground reflections is reduced when the center axis of the beam of the radar is above ground (horizon). However, because the center axis of the beam is above ground, a substantial area between the earth and the center axis of the beam may be rejected allowing a target in that area to go undetected.

A method of target tracking wherein the track signal is inhibited during periods of multipath conditions is described in U.S. Pat. No. 3,130,402 issued on Apr. 21, 1964. Two channels are employed to give independent target position information. As long as both channels provide the same target position information, the target is tracked; whenever the position information differs, as it would be for target returns due to multipath conditions, a track signal gate is inhibited and tracking stops. This radar relies on the assumption that the period of inhibited tracking is small with respect to the total tracking period, and that two equal, but erroneous position signals will not be produced. Continuous or severe image or false target signals produced from ground or water reflections may cause substantial periods of time where tracking is inhibited.

A prior art method of detecting multipath conditions operates on the knowledge that a direct radar reflection (from a target to the radar antenna) has a different path than a multipath reflection, from the target to the reflecting surfaces to the radar antenna, and that these different reflection paths can frequently be converted to signals having energy in quadrature ±90° out of phase relative to each other, so that when the quadrature signals are received, multipath conditions are assumed. However, not all multipath conditions produce quadrature signals, therefore the elevation measurements produced by multipath reflections not having quadrature signals appear to be true measurements in free space conditions.

It is desirable to provide a radar system and method for determining whether or not a multipath condition exists.

It is desirable to provide a radar system and method for tracking a target through the transition from free space to a multipath condition with minimum tracking disturbance.

It is desirable to provide a radar system and method for reliably tracking targets with minimized track error under multipath conditions.

It is desirable to provide a radar system and method for determining the position of a target under multipath conditions.

SUMMARY OF THE INVENTION

In accordance with the present invention, the radar signals are transmitted and received by two independent antennae or antenna positions that each generate a beam angularly spaced in elevation a predetermined amount relative to the other. The signals which are detected by the two antennae or antenna positions are processed in one or two receiving channels to provide an in-phase and quadrature phase component thereof for each signal. Each in-phase signal for its respective channel is processed to provide an elevation signal for the target. The target elevation signal for each channel is compared with each other. The elevation signal angle difference and the quadrature signals from each channel are each compared to a respective reference or threshold. The results of the comparisons are used to select one of the two channels for controlling the antenna position to track the target in elevation.

More specifically, when the difference between the two elevation measurements exceeds a predetermined amount and/or one or both of the quadrature phase signals exceeds a predetermined threshold level, several system responses may occur, including switching antenna position control from one channel to the other, filtering the elevation signals, adding a correction signal to the elevation signal, indicating the presence of multipath conditions and the relative severity of the multipath condition, and providing auxiliary target-to-image position angle, target-to-image signal phase angle, and surface reflection coefficient information.

BRIEF DESCRIPTION OF THE DRAWINGS

FIG. 2 shows an antenna for use in the embodiment of FIG. 1;

FIG. 3 shows the propagation pattern from the antenna of FIG. 2;

FIG. 4 is a graph showing the reception pattern of the antenna of FIG. 2;

FIG. 5 is a graph of the sum and difference signals as a function of off boresight angle;

FIG. 12 is a vector diagram of processed target reflected signals in free space conditions;

FIG. 13 is a vector diagram of processed target reflected signals including multipath reflections for the special case where $\alpha = 0$;

FIG. 14 is a general vector diagram of processed target reflected signals including multipath reflections.

DESCRIPTION OF THE PREFERRED EMBODIMENT

Figure 1:
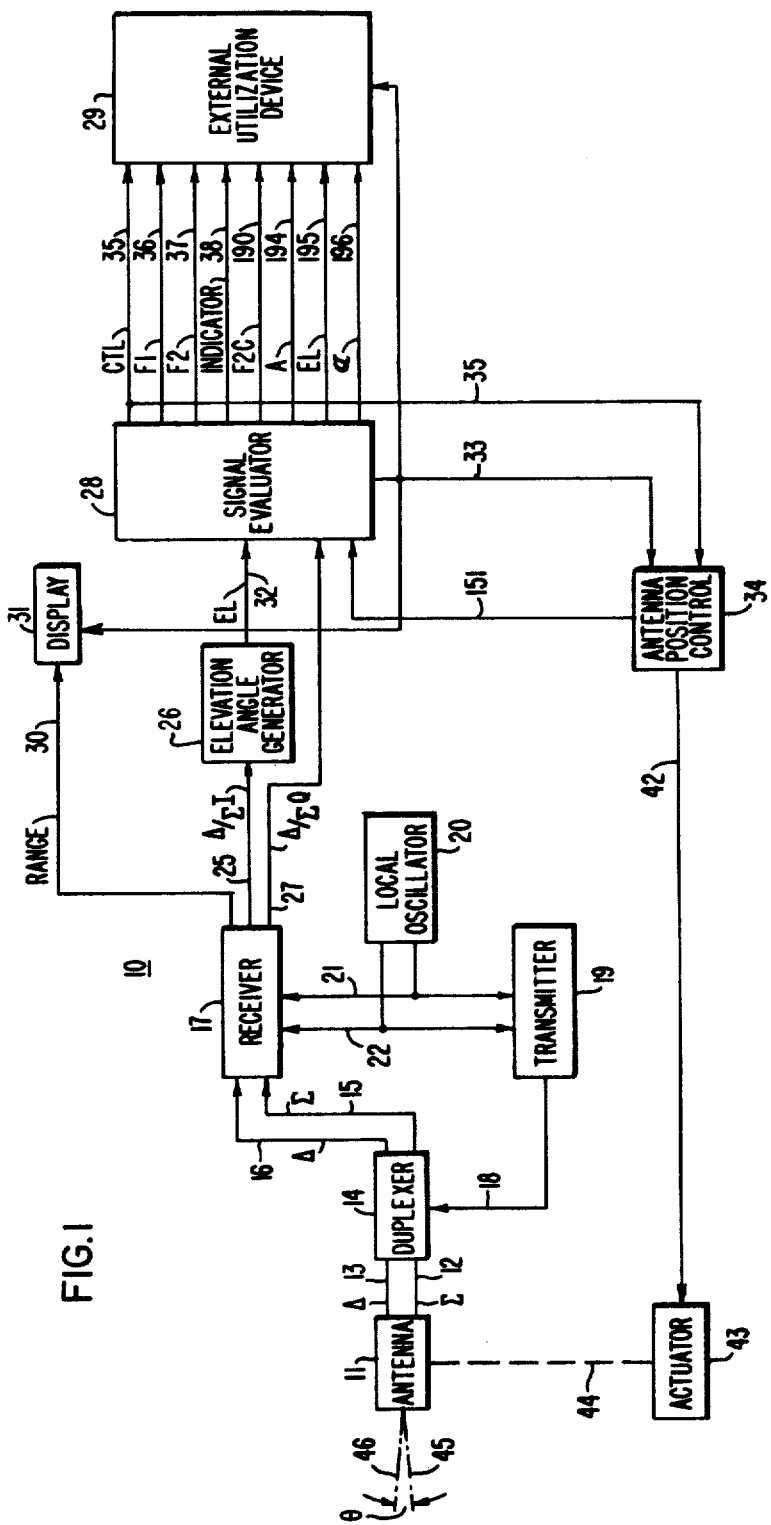
FIG. 1 is one embodiment of the invention.

Referring now to the drawing, and in particular to FIG. 1, a radar 10 is shown having an antenna 11 which may for example be a monopulse antenna having a sum and difference channel which may be coupled over lines 12 and 13, respectively, to an input/output terminal of duplexer 14. Duplexer 14 functions to couple lines 12 and 13 to lines 15 and 16, respectively, at times radar 10 is receiving. Lines 15 and 16 are coupled to an input of receiver 17.

Duplexer 14 functions to couple line 12 to the line 18 at times transmitter 19 is transmitting. Local oscillator 20 provides coherent frequency signals over lines 21 and 22 to both receiver 17 and transmitter 19.

Receiver 17 functions to generate in-phase and quadrature signals from the received sum and difference signals provided by antenna 11. The in-phase signal is coupled from receiver 17 over line 25 to an input of elevation angle generator 26. The quadrature signal from receiver 17 is coupled over line 27 to an input of signal evaluator 28.

Receiver 17 may also generate a range signal which is coupled over line 30 to an input of display 31.

Elevation signal generator 26 functions to provide an elevation angle indicative of target position with respect to the antenna boresight at the time the target signals are received as a function of the in-phase signal on line 25. The elevation angle signal is coupled over line 32 to an input of the signal evaluator 28. One output of signal evaluator 28 indicative of an elevation angle is coupled over line 33 to an input of display 31 and to an input of antenna position control 34. Signal evaluator 28 shown in more detail in FIG. 9 may have additional output signals such as CTL, F1, F2, indicator, F2C, A, EL and $\alpha$ coupled over lines 35 through 38, 190, and 194 through 196, respectively, to external utilization devices. Signal CTL is coupled over line 35 to an input of antenna position control 34. The output of antenna position control 34 is coupled over line 42 to an input of actuator 43. Actuator 43 functions to mechanically position antenna 11 as shown by dashed line 44 in response to the signal on line 42.

Antenna 11 has a boresight indicating the centroid of a beam of radiation emanating from and received by the antenna shown by reference line 45. A second reference line 46 indicates the boresight of antenna 11 when the antenna may be mechanically rotated through an angle $\theta$ thus moving the boresight reference line 45 to 46 through an angle $\theta$. Alternatively, antenna 11 may be electronically scanned whereby a beam of the antenna may be electronically directed in a second direction such as indicated by boresight reference line 46. In that case, actuator 43 would be replaced by electrical control circuits which would provide signals to antenna 11 to electronically direct the beam.

In FIG. 1, antenna 11 may be conventional monopulse antenna, phased array antenna or a multiple feed antenna to provide two antenna beams having an angular offset of a predetermined angle $\theta$. Each beam is operated during separate time periods. Duplexer 14, receiver 17, transmitter 19, local oscillator 20, elevation angle generator 26, and display 31 are conventional components well known in the art for fabricating a coherent monopulse radar. Actuator 43 and antenna position control 34 are also well known in the art as components for implementing a radar.

Referring to FIG. 2, a multiple feed antenna is shown for generating two monopulse beams offset by a predetermined angle $\theta$. In FIG. 2, feed elements 51 through 53 are coupled over transmission lines 54 through 56, respectively, to a source of radio frequency or microwave energy for radiating energy from feed elements 51 and 52 during a first time period to form a beam having a predetermined beam width along boresight reference line 46. The beam from feed elements 51 and 52 is facilitated by the aid of reflector 57 (FIG. 3) which is conventional in the art. During a second time interval, radio frequency energy is coupled to feed elements 52 and 53 to form a beam having a predetermined beam width along boresight reference line 45. Transmission line 54 is coupled to one port of hybrid junction 59. Transmission line 55 is coupled to a second port of hybrid junction 59 and a port of hybrid junction 60. Transmission line 56 is coupled to a second port of hybrid junction 60.

When antenna 11 is receiving target reflected signals from a beam transmitted along boresight 46, hybrid 59, during a first time period, will combine the received signals on transmission lines 54 and 55 together and provide an output signal on line 15' called the sum, $\Sigma_{EL2}$. When antenna 11 is receiving target reflected signals from a beam transmitted along boresight 45, hybrid 60 will combine the received signals on transmission lines 55 and 56 together and provide an output signal on line 15 which is called signal sum, $\Sigma_{EL1}$. Hybrid junction 60 also subtracts the receive signals on lines 55 and 56 to provide a difference signal coupled out on line 16 called signal $\Delta_{EL1}$. Hybrid junction 59 also subtracts the received signals on transmission lines 54 and 55 to provide a difference signal on line 16' called $\Delta_{EL2}$. The operation of hybrid junctions 59 and 60 is well known in the art of monopulse antennas.

In FIG. 2, the necessary feed elements for operation of two beams in the elevation direction only is shown and one skilled in the art would be able to incorporate feed elements in the azimuth direction to provide both elevation and azimuth monopulse error difference signals for the beam along boresight reference lines 45 and 46.

FIG. 3 shows a graph of the antenna pattern in polar coordinates of each feed when radiating microwave or RF energy. The propagation pattern associated with feed element 51 is shown by curve 62. The propagation patterns radiated by feeds 52 and 53 are shown by curves 63 and 64. It is to be understood that either feeds 51 and 52 would be excited at one time to form a beam along boresight reference line 46 or feeds 52 and 53 would be excited at one time to form a beam along boresight reference line 45. In FIG. 3, the radius from center C represents amplitude and the azimuth represents angle.

FIG. 4 is a graph showing the reception pattern of antenna 11 in FIG. 2. In FIG. 4, polar coordinates having a center at C are used to represent a boresight angle with the radius representing amplitude. Curve 66 shows the sum pattern $\Sigma_{EL1}$ along boresight reference line 45. Curve 67 shows the reception pattern of the sum signal $\Sigma_{EL2}$ along boresight reference line 46. Curves 68 and 69 show the difference pattern to provide signal $\Delta_{EL1}$ and curves 70 and 71 show the difference pattern of signal $\Delta_{EL2}$. It is understood that during reception, antenna 11 would receive a sum signal corresponding to curve 66 and a difference signal corresponding to curves 68 and 69 or a sum signal corresponding to curve 67 and a difference signal corresponding to curves 70 and 71. By utilizing the antenna of FIG. 2, two monopulse beams may be transmitted and received at first and second time periods along boresight reference lines 45 and 46 having a predetermined angular displacement $\theta$. The beam width is normally considered to be the width of a pattern at three decibels less.

FIG. 5 is a graph of the sum and difference signals resulting from the reception patterns shown in FIG. 4. In FIG. 5, the ordinate represents amplitude and the abscissa represents off-boresight angle with respect to boresight reference lines 45 and 46. In FIG. 5, curve 75 represents the sum signal $\Sigma_{EL2}$. Curve 76 represents the sum signal $\Sigma_{EL1}$. Curve 77 represents the difference signal $\Delta_{EL2}$ and curve 78 represents the difference signal $\Delta_{EL1}$. As can be seen, the peak of the sum signals and the zero crossing of the difference signals, respectively, occurs along the respective boresight reference lines 45 and 46.

Figure 6:
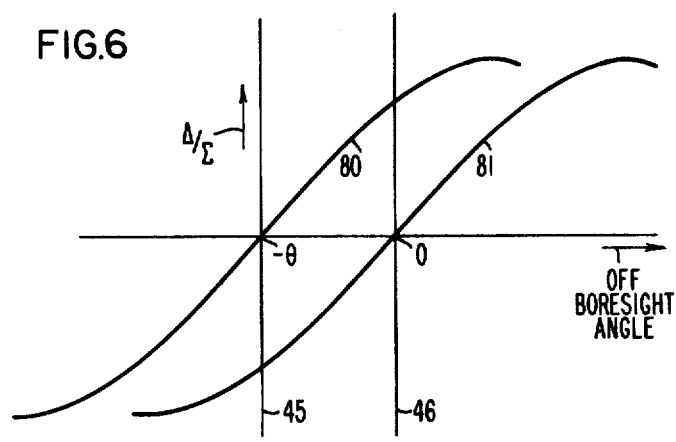
FIG. 6 is a graph of the difference signals divided by their respective sum signals.

FIG. 6 is a graph of the difference signals divided by their respective sum signals to provide curves 80 and 81 indicative of target position or target elevation. In FIG. 6 the ordinate represents amplitude and the abscissa represents off-boresight elevation angle. Curve 80 corresponds to the difference signal $\Delta_{EL1}$ divided by the sum signal $\Sigma_{EL1}$, both from FIG. 5. Curve 81 corresponds to the difference signal $\Delta_{EL2}$ divided by the sum signal $\Sigma_{EL2}$, both from FIG. 5. As can be seen in FIG. 6, curves 80 and 81 cross zero amplitude at the angle corresponding to their respective boresight reference lines 45 and 46.

Curves 80 and 81 in FIG. 6 provide two independent measurements of target elevation by tracking or illuminating the same target with two beams where each beam is operated during different time periods. It is understood that the beam width and beam separation is adjusted so that each beam illuminates the target or is likely to illuminate the target when tracking without multipath conditions even though the beams are angularly offset by an angle $\theta$ with respect to each other. For example, each beam may have a width of fifty milliradians and an angular offset $\theta$ between the beams in elevation of thirty milliradians. These values correspond to an angle offset $\theta$ between the two beams of typically 60% of the beam width.

Elevation angle generator 26 shown in FIG. 1 may utilize curves 80 and 81 to provide elevation angle measurements from the in-phase on line 25. The data from curves 80 and 81 may be stored in a look-up table or memory to provide an elevation or off boresight angle on line 32 as a function of the in-phase $\Delta/\Sigma$, signal on line 25. The data may be generated experimentally by directing the antenna at a stationary test target in free space and angularly incrementing the antenna in elevation off boresight while storing the value of the in-phase signal $\Delta/\Sigma$ as a function of the off boresight antenna position angle. The data stored in elevation angle generator 26 may be periodically updated in the field to account for any antenna or receiver variations such as from component drift and temperature effects.

In summary, antenna 11 functions to provide the reception of target signals with antenna patterns along two boresight axes spaced apart by an angle $\theta$ to generate two elevation signals which are independent of each other due to the angular displacement $\theta$ between the receiving beams or patterns.

In multipath conditions, the two beams will be independent with respect to the target signals received by way of reflecting surface. The reflecting surface is the cause of the multipath condition and elevation measurements are made transverse to this surface. Even though the antenna beams are displaced angularly relative to each other, the displacement is only a portion of the beam-width so that the two beams illuminate the target with a sufficient signal to noise ratio to enable two concurrent elevation measurements to be made. For example, one measurement may be made during a first time period on boresight with respect to a first monopulse measurement and a second measurement may be made during a second time period with a second monopulse measurement angularly offset from the first measurement. It is understood that the time between the two time periods is relatively short such that the target appears stationary and is illuminated by both beams. Thus if one beam is pointed at the target on boresight, then the second beam will be pointed off boresight at the target and the measurement by the second beam will be made off-boresight and the measurement by the first beam will be made on boresight or very close thereto. As long as the signal to noise ratio is sufficient for target signals from both beams or as long as the target is sufficiently illuminated by the first and second beams, the two elevation measurements may be made.

Figure 7:
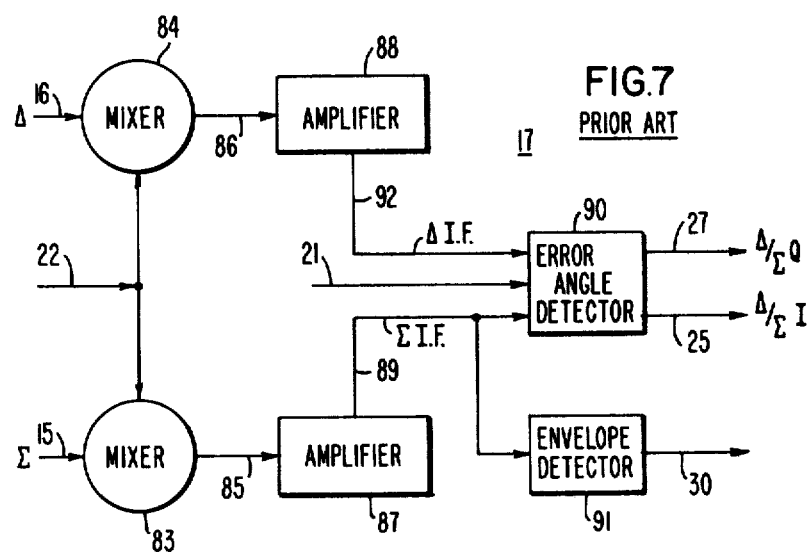
FIG. 7 is a block diagram of one embodiment of a radar receiver suitable for use in the embodiment of FIG. 1.

FIG. 7 is a block diagram of one embodiment of radar receiver 17 to provide in-phase and quadrature signals from the sum and difference signals. A receiver 17 for providing the in-phase and quadrature signals is known to those skilled in the art. The sum signal on line 15 is coupled to a first input of mixer 83. The difference signal on line 16 is coupled to a first input of mixer 84. A coherent frequency signal from local oscillator 20 is coupled over line 22 to a second input of mixers 83 and 84. The respective outputs of mixers 83 and 84 are coupled over lines 85 and 86 to the inputs of amplifiers 87 and 88, respectfully, to amplify the intermediate frequency signals. The output of amplifier 87 is coupled over line 89 to a first input of error angle detector 90 and an input of envelope detector 91. Envelope detector 91 functions to provide an output signal on line 30 at times the sum signal exceeds an amplitude threshold voltage. The output of amplifier 88 is coupled over line 92 to a second input of error angle detector 90.

Error angle detector 90 functions to divide the difference signal on line 92 by the sum signal on line 89 to provide the real component or in-phase signal on line 25 and the imaginary component or quadrature signal on line 27. Error angle detector 90 also has an input on line 21 to provide a frequency signal from local oscillator 20.

Figure 8:
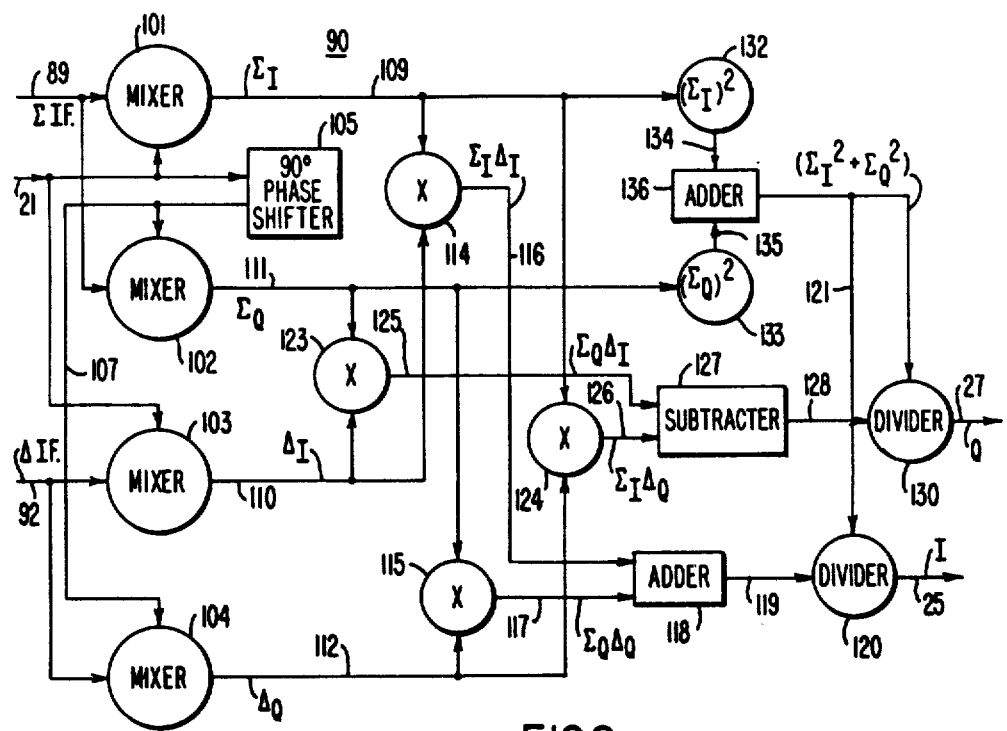
FIG. 8 is a block diagram of one embodiment of error angle detector suitable for use in the radar receiver of FIG. 7.

FIG. 8 is a block diagram of one embodiment of error angle detector 90. The sum signal on line 89 is coupled to a first input of mixers 101 and 102. The difference signal on line 92 is coupled to a first input of mixers 103 and 104. Local oscillator 20 shown in FIG. 1 provides on line 21 a coherent frequency signal to a second input of mixers 101 and 103 and to an input of 90° phase shifter 105. The output of 90° phase shifter 105 is coupled over line 107 to a second input of mixers 102 and 104. The output signals from mixers 101 and 103 are the sum in-phase signal, $\Sigma_I$, and difference in-phase signal, $\Delta_I$, on lines 109 and 110, respectively. The output signals from mixers 102 and 104 are the sum quadrature signal, $\Sigma_Q$, and difference quadrature signal, $\Delta_Q$, on lines 111 and 112, respectively. The output signals on lines 109 through 112 from mixers 101 through 104 are base band signals, with the carrier frequency removed, which are periodic signals extending from zero hertz to 20,000 hertz.

In FIG. 8, the desired in-phase error signal, I, on line 25 and the quadrature error signal, Q on line 27, are produced according to the following arithmetic relationship:

$$\frac{\Delta_R}{\Sigma_R} = \frac{\Delta_I + j\Delta_Q}{\Sigma_I + j\Sigma_Q} \quad (1)$$

where $\Delta_R$ equals $\Delta_I + j\Delta_Q$ and $\Sigma_R$ equals $\Sigma_I + j\Sigma_Q$ are resultant vectors seen in FIG. 14, 241 and 244 respectively, which is also the modulation information, phase and amplitude, of the sum $\Sigma$ and difference $\Delta$ intermediate frequency signals entering error angle detector 90 from intermediate frequency amplifiers 87 and 88 on lines 89 and 92, respectively. The in-phase and quadrature components are arithmetically isolated by first multiplying by the complex conjugate:

$$\frac{\Delta_R}{\Sigma_R} = \frac{(\Delta_I + j\Delta_Q)}{(\Sigma_I + j\Sigma_Q)} \times \frac{(\Sigma_I - j\Sigma_Q)}{(\Sigma_I - j\Sigma_Q)} \quad (2)$$

producing:

$$\frac{\Delta_R}{\Sigma_R} = \frac{\Delta_I\Sigma_I - j\Delta_I\Sigma_Q + j\Delta_Q\Sigma_I + \Delta_Q\Sigma_Q}{\Sigma_I^2 + \Sigma_Q^2} \quad (3)$$

$$\frac{\Delta_R}{\Sigma_R} = \frac{\Delta_I\Sigma_I - j\Delta_I\Sigma_Q + j\Delta_Q\Sigma_I + \Delta_Q\Sigma_Q}{\Sigma_I^2 + \Sigma_Q^2} \quad (3)$$

then separating the real and imaginary terms:

$$\frac{\Delta_R}{\Sigma_R} = \underbrace{\left[\frac{\Delta_I\Sigma_I + \Delta_Q\Sigma_Q}{\Sigma_I^2 + \Sigma_Q^2}\right]}_{I} + j\underbrace{\left[\frac{\Delta_Q\Sigma_I - \Delta_I\Sigma_Q}{\Sigma_I^2 + \Sigma_Q^2}\right]}_{Q} \quad (4)$$

the in-phase error signal, I, is the first (real) component and the quadrature error signal, Q, is the second (imaginary) component. The above manipulation is implemented in discrete steps, as shown in FIG. 8 to provide I on line 25 and Q on line 27.

The in-phase error signal, I, on line 25 is produced arithmetically by first multiplying $\Sigma_I$ on line 109 by $\Delta_I$ on line 110 in multiplier 114 and multiplying $\Sigma_Q$ on line 111 by $\Delta_Q$ on line 112 in multiplier 115. The outputs of multipliers 114 and 115 are coupled over lines 116 and 117 to adder 118. The output of adder 118 is coupled over line 119 to an input of divider 120 where the input is treated as the numerator and is divided by $(\Sigma_I^2 + \Sigma_Q^2)$ on line 121 to provide the in-phase error signal I on line 25.

The quadrature error signal, Q, on line 27 is produced arithmetically by first multiplying $\Sigma_Q$ on line 111 by $\Delta_I$ on line 110 in multiplier 123 and multiplying $\Sigma_I$ on line 109 by $\Delta_Q$ on line 112 in multiplier 124. The outputs of multipliers 123 and 124 are coupled over lines 125 and 126 to subtractor 127. The output of subtractor 127 is coupled over line 128 to an input of divider 130 where the input is treated as the numerator and is divided by $(\Sigma_I^2 + \Sigma_Q^2)$ on line 121 to provide the quadrature error signal Q on line 27.

The denominator input on line 121, $(\Sigma_I^2 + \Sigma_Q^2)$ is produced arithmetically by multipliers 132 and 133 which are coupled over lines 134 and 135, respectively, to respective inputs on adder 136. Multiplier 132 has an input coupled to line 109, $\Sigma_I$, and provides $(\Sigma_I)^2$ at its output on line 134. Multiplier 133 has an input coupled to line 111, $\Sigma_Q$, and provides $(\Sigma_Q)^2$ at its output on line 135. Adder 136 provides an output on line 121 of $(\Sigma_I^2 + \Sigma_Q^2)$.

The calculation of the in-phase and quadrature error signals, I and Q, may be done in hardware or the calculation may be done in a general purpose computer with an appropriate program. The $\Sigma_I$, $\Sigma_Q$, $\Delta_I$ and $\Delta_Q$ signals may be digitized at lines 109, 111, 110, and 112, respectively, for entry into a computer and the above computations of equation 4 may be thereafter calculated by the digital computer.

Figure 9:
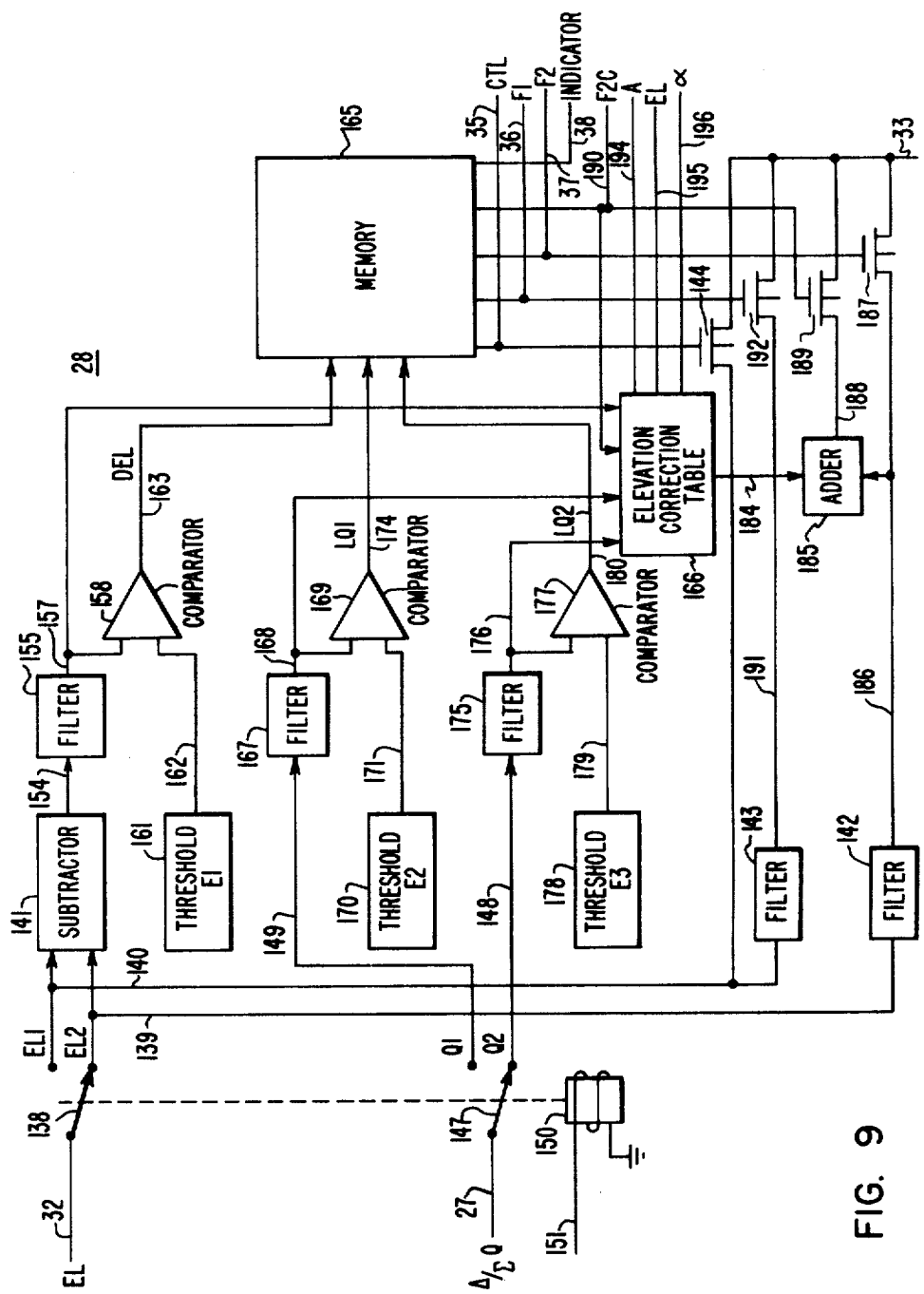
FIG. 9 is a block diagram of one embodiment of the signal evaluator shown in FIG. 1.

Referring to FIG. 9, one embodiment of signal evaluator 28 is shown. Line 32 is coupled via switch 138 to line 139 when the switch is in the down position and line 140 when the switch is in the up position. Line 139 is coupled to one input of subtractor 141 and to an input of filter 142. Line 140 is coupled to a second input of subtractor 141, to an input of filter 143 and to the drain or source of transistor 144 which may, for example, be a metal oxide semiconductor (MOS) transistor.

Line 27 is coupled via switch 147 to line 148 when switch 147 is in the down position and line 149 when switch 147 is in the up position. Switches 138 and 147 are controlled by solenoid 150 having a timing control signal on line 151 to a coil of solenoid 150 with the other side coupled to ground. It is understood that switches 138 and 147 may be implemented with multiplex circuits which would eliminate the need for solenoid 150. The position of switches 138 and 147 is controlled by the signal on line 151 to couple signals resulting from a first boresight position to lines 140 and 149, signals EL1 and Q1 (boresight reference line 45). When antenna 11 is directed along boresight reference line 46, input lines 32 and 27 will be coupled to lines 139 and 148, respectively, which will contain signals EL2 and Q2. Antenna position control 34 has an output coupled over line 151 to solenoid 150 to provide the control signal indicating when the antenna is directed along the boresight reference line 45 or 46 and to control switches 138 and 147 accordingly.

Signals EL1 and EL2 represent an estimate of target elevation derived from target signals along boresight reference lines 45 and 46. Subtractor 141 determines the difference between elevation signals EL1 and EL2 and couples the difference signal on line 154 to an input of filter 155. The output of filter 155 is coupled over line 157 to an input of comparator 158 and to an input of elevation correction table 166. Threshold 161 provides a predetermined value, such as voltage E1 over line 162 to a second input of comparator 158. Comparator 158 functions to compare the input voltages on lines 157 and 162 to provide an output signal DEL on line 163. The output of comparator 158 may be a logic zero signal when the voltage on line 162 exceeds the voltage on line 157 and a logic one when the voltage on line 157 exceeds the voltage on line 162. Line 163 is coupled to an input of memory 165.

Signal Q1 is coupled over line 149 to an input of filter 167 having an output over line 168 coupled to an input of comparator 169 and an input of elevation correction table 166. Threshold 170 functions to provide a predetermined value such as a voltage E2 which is coupled out on line 171 to a second input of comparator 169. Comparator 169 functions to compare the voltage on 171 to the voltage on 168 to provide a logic output signal LQ1 which is a logic one at times the voltage on line 168 exceeds the voltage on line 171. The output of comparator 169 is a logic zero at times the voltage on line 171 exceeds the voltage on line 168. The output of comparator 169, signal LQ1 is coupled over line 174 to an input of memory 165.

Signal Q2 representing the quadrature signal when antenna 11 is directed along boresight reference line 46 is coupled over line 148 to an input of filter 175. The output of filter 175 is coupled over line 176 to an input of comparator 177 and an input of elevation correction table 166. Threshold 178 which functions to provide a predetermined value such as voltage E3 is coupled over line 179 to a second input of comparator 177. Comparator 177 functions to provide a logic signal LQ2 at times when the voltage on line 176 exceeds the voltage on line 179. LQ2 is a logic zero at times the voltage on line 179 exceeds the voltage on line 176. The output of comparator 177 signal LQ2 is coupled over line 180 to an input of memory 165.

One output of elevation correction table 166 is coupled over line 184 to an input of adder 185. Elevation correction table 166 functions to generate an elevation correction angle signal on line 184 which, when added to elevation signal EL2 after it passes through filter 142 provides a best estimate of the angular location of the target under certain multipath conditions. Signal EL2 is coupled to the input of filter 142 over line 139. The output of filter 142 is coupled over line 186 to an input of adder 185 and to the drain or source electrode of transistor 187. The other drain or source of transistor 187 is coupled to line 33. The gate of transistor 187 is coupled to line 37 which receives a signal F2 from memory 165. The output of adder 185 is coupled over line 188 to the drain or source of transistor 189. The other drain or source of transistor 189 is coupled to line 33. A control signal F2C is coupled over line 190 to the gate of transistor 189.

Signal EL1 is coupled to the input of filter 143 over line 140 and to the drain or source of transistor 144. The output of filter 143 is coupled over line 191 to the drain or source of transistor 192. The other drain or source of transistor 192 is coupled to line 33. Control signal F1 from memory 165 is coupled over line 36 to the gate of transistor 192. The other side of transistor 144, the drain or source, is coupled to line 33. Control signal CTL from memory 165 is coupled over line 35 to the gate of transistor 144. Transistors 144, 192, 189 and 187 function to couple or multiplex an elevation signal one at a time to line 33 under control of the signals on lines 35, 36, 37 and 190 from memory 165.

Figure 15:
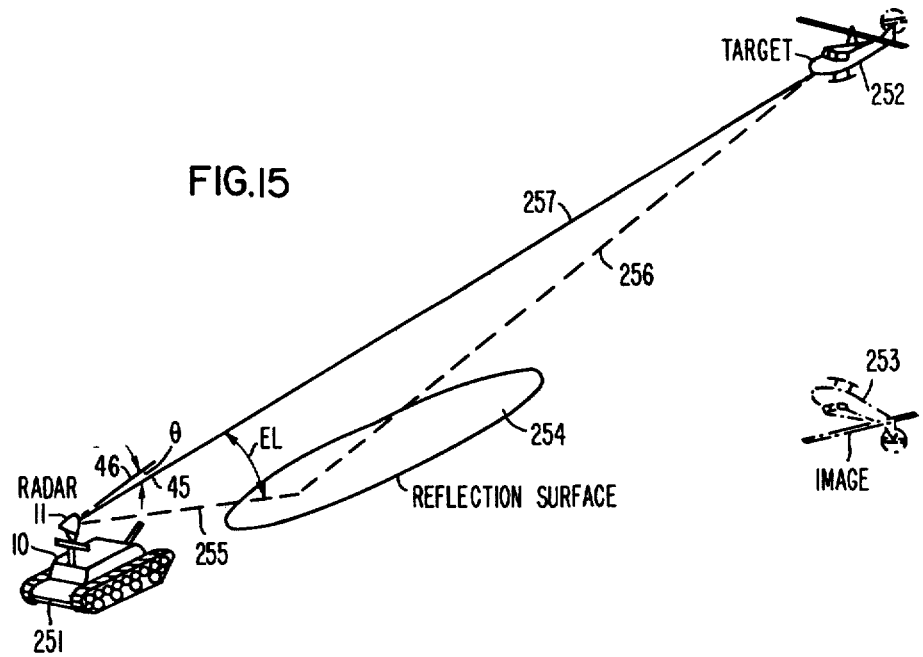
FIG. 15 illustrates multipath conditions.

The elevation signal on line 33 is the best estimate of the actual physical position of the target in or out of the presence of multipath conditions. FIG. 15 shows an example of multipath conditions. An alternate embodiment of FIG. 1 would be to couple line 140 in place of line 33 to antenna position control 34. Signal EL1 would be used at all times to position antenna 11 through antenna position control 34. Even though EL1 may not represent the actual physical position of the target in the presence of multipath conditions, EL1 may tend to position the antenna 11 for maximum signal return and therefore may provide tracking in multipath conditions with the highest signal to noise ratio. Considerable image signal may be received off the reflecting surface 254 which enhances the total received energy. Thus the antenna by dipping towards the reflecting surface or down in elevation with respect to the target may receive more signal energy. Line 33 still provides the best estimate of the actual physical position of the target and may be used by an external utilization device 29.

In operation, the signal evaluator 28 compares the elevation signals EL1 and EL2 on lines 139 and 140 to see if they agree. This is accomplished by using subtractor 141 and comparator 158 along with a threshold value from threshold 161. It is understood that the two elevation signals EL1 and EL2 are made along boresight reference lines 45 and 46 which are offset in angle to allow independent measurement of a target and yet illuminate the target with the main beam along both boresight reference axis. Normally, when the target is in free space above ground, no image or multipath condition exists. When no multipath condition exists, the output out of subtractor 141 will be low and below a predetermined difference value from threshold 161. The output of comparator 158 signal DEL will be a logical 0. If a difference in elevation angles EL1 and EL2 exist which is greater than the threshold voltage E1 then the output of comparator 158 signal DEL will be a logical 1. The quadrature signal Q1 on line 149 is compared against the voltage E2 from threshold 170 by comparator 169. If the quadrature signal Q1 exceeds the voltage on line 171 then signal LQ1 will be a logical 1 indicative of multipath conditions. Quadrature signal Q2 on line 148 represents the quadrature signal along boresight reference line 46 and is compared with the value of voltage E3 from threshold 178 in comparator 177. If quadrature signal Q2 exceeds the voltage on line 179, then the output signal LQ2 will be a logical 1 indicative of multipath conditions. The concurrent use of signals LQ1, LQ2 and DEL provide a reliable indication of multipath conditions with respect to the target signals received along one or both boresight reference lines 45 and 46.

The logic signals DEL, LQ1 and LQ2 on lines 163, 174 and 180, respectively, may be used to index or address memory 165. The three binary logic signals would decode eight possible addresses representative of the eight possible combinations of logic signals. Memory 165 may contain predetermined constants on a number of bit lines for each address as shown in Table I.

TABLE I

| DEL | LQ$_1$ | LQ$_2$ | CTL | F1 | F2 | F2C | INDICATOR |
|---|---|---|---|---|---|---|---|
| 0 | 0 | 0 | 1 | 0 | 0 | 0 | 1 |
| 0 | 0 | 1 | 0 | 1 | 0 | 0 | 4 |
| 0 | 1 | 0 | 0 | 1 | 0 | 0 | 2 |
| 0 | 1 | 1 | 0 | 1 | 0 | 0 | 3 |
| 1 | 0 | 0 | 0 | 0 | 0 | 1 | 2 or 3 |
| 1 | 0 | 1 | 0 | 1 | 0 | 0 | 4 |
| 1 | 1 | 0 | 0 | 0 | 1 | 0 | 2 |
| 1 | 1 | 1 | 0 | 0 | 0 | 1 | 3 |

INDICATOR:
1 = FREE SPACE TRACK
2 = MODERATE MULTIPATH CONDITION
3 = SEVERE MULTIPATH CONDITION
4 = VERY IMPROBABLY MULTIPATH ON BEAM 2 AND NOT BEAM 1, COULD HAPPEN WITH VERY BAD ANTENNA SIDE LOBES

The output or bit lines from memory 165 may be used to control switches 144, 187, 189 and 192 and for providing an indication of multipath conditions on line 38. Control signal CTL on line 35, F1 on line 36, F2 on line 37, F2C on line 190 cause elevation signal EL1, EL1 filtered, EL2 filtered, or EL2 filtered with a correction added to be fed on line 33 to antenna position control 34. For example, if no multipath condition exists, then signals DEL, LQ1 and LQ2 would be all logic zero and antenna position control 34 may be driven by elevation signal EL1 which is the elevation signal derived from target signals along boresight reference line 45. In this mode of operation, elevation signals EL2 would be derived from target signals along boresight reference line 46 which would be off boresight with respect to the target if boresight reference line 45 is pointed at the target. Both beams, however, would illuminate the target.

Table I provides the values of the control signals for eight combinations of address signals DEL, LQ1 and LQ2. As shown in Table I, if DEL is a logical zero, LQ1 is a logical zero and LQ2 is a logic one, then the target signals along boresight reference line 46 exhibits a guadrature component indicative of multipath which is not very probable if the boresight reference line 46 is higher in elevation than boresight reference line 45. This could happen if antenna 11 has very bad side lobes. In this condition, control signal F1 would be a logic one causing antenna position control 34 to use filtered elevation signals EL1. Filtered elevation signals EL1 would be a valid position for the target since no mutipath conditions were shown along boresight reference line 45. To reduce tracking lag, F1 may be set to zero and CTL set to one if tracking up to the time of the address 001 was 000 for signals DEL, LQ1 and LQ2. If the address signal is 010, then an shown on Table I, F1 is a logic one causing antenna position control 34 to track with filtered elevation signals EL1. If the address signal is 011, then as shown in Table I, F1 is a logic one causing antenna position control 34 to track with filtered elevation signals EL1. For address signals, 010, moderate multipath conditions are indicated on line 38 by the number 2 since the lower beam along boresight reference line 45 contains a quadrature component in the target signals. For address signal 011, severe multipath conditions are indicated by the number 3 on line 38 due to the fact that both beams along boresight reference lines 45 and 46 have a quadrature component in the target reflected signals.

For address line 100 as shown in Table I, control signal F2C is a logic one causing antenna position control 34 to use filtered elevation signals EL2 with a correction value added from elevation correction table 166. For address signal 100, moderate or severe multipath conditions are indicated since the elevation signals EL1 and EL2 differ beyond the threshold value E1 while the quadrature components indicate zero which mean that the target signals with respect to image signals have a phase relationship of 0° or 180°.

For address 101, control signal F1 is a logic one causing antenna position control 34 to use filtered elevation signals EL1. Address signal 101 is very improbable for multipath conditions since the quadrature component is observed for target reflected signals along boresight reference axis 46 which could happen if antenna 11 has very bad sidelobes.

For address 110, control signal F2 is a logic one causing antenna position control 34 to use filtered elevation signal EL2. For address 110, moderate multipath condition is indicated on line 38 which is reasonable since a difference in elevation signals EL1 and EL2 which exceeds the threshold E1 is detected and a quadrature component is received for target reflected signals along boresight reference line 45. No quadrature signals are indicated for target reflected signals received along boresight reference line 46 which would be expected.

For address signal 111, control signal F2C would be a logic one causing antenna position control 34 to use filtered elevation signal EL2 with an elevation correction signal added from elevation correction table 166. For address 111, severe multipath condition is indicated since quadrature component signals are received from target and image signals along both boresight reference lines 45 and 46. In addition, the difference in elevation signals EL1 and EL2 exceed the threshold E1.

Figure 11:
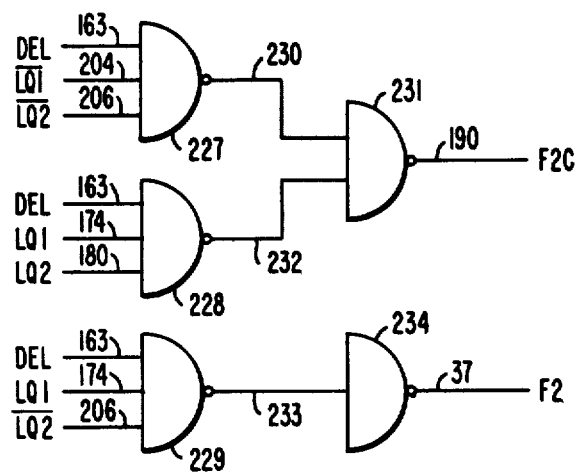
FIGS. 10 and 11 together show an alternate embodiment of a portion of signal evaluator 28.
Figure 10:
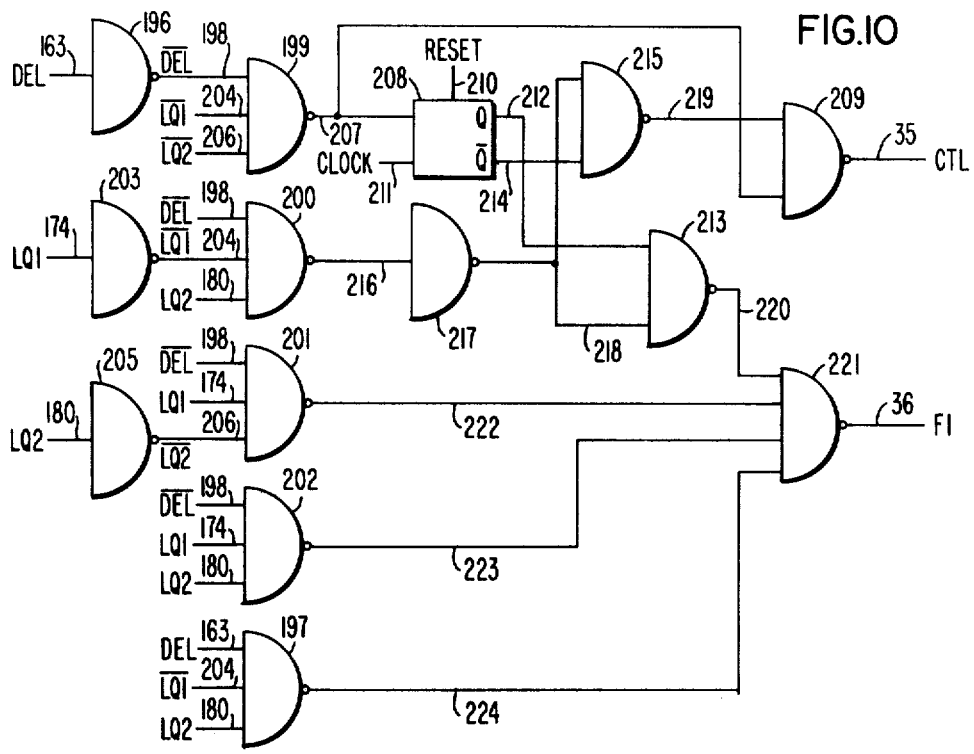

In place of memory 165 which stores a number of predetermined constants, logic gates may be used as shown in FIGS. 10 and 11 to decode the eight possible logic combinations to generate the control signals in response to the address or logic signals DEL, LQ1 and LQ2 as shown in Table I. In FIG. 10, signal DEL on line 163 is coupled to an input of NAND gate 196 and NAND gate 197. The output of NAND gate 196 is signal $\overline{DEL}$ which is coupled over line 198 to an input of NAND gate 199, NAND gate 200, NAND gate 201, and NAND gate 202. Signal LQ1 on line 174 is coupled to an input of NAND gate 203, NAND gate 201 and NAND gate 202. The output of NAND gate 203 is signal $\overline{LQ1}$ which is coupled over line 204 to an input of NAND gates 199, 200 and 197. Signal LQ2 is coupled over line 180 to an input of NAND gate 205, NAND gate 200, NAND gate 202 and NAND gate 197. The output of NAND gate 205 is signal $\overline{LQ2}$ which is coupled over line 206 to an input of NAND gate 199 and NAND gate 201. The output of NAND gate 199 is coupled over line 207 to an input of flip-flop 208 and an input of NAND gate 209. Flip-flop 208 has a reset signal coupled to it over line 210 and a clock signal coupled to it over line 211. The true output of flip-flop 208 is coupled over line 212 to an input of NAND gate 213. The complement output of flip-flop 208 is coupled over line 214 to an input of NAND gate 215. The output of NAND gate 200 is coupled over line 216 to an input of NAND gate 217. The output of NAND gate 217 is coupled over line 218 to an input of NAND gate 215 and NAND gate 213. The output of NAND gate 215 is coupled over line 219 to an input of NAND gate 209. The output of NAND gate 209 is coupled over line 35 and is signal CTL. The output of NAND gate 213 is coupled over line 220 to an input of NAND gate 221. The output of NAND gate 201 is coupled over line 222 to an input of NAND gate 221. The output of NAND gate 202 is coupled over line 223 to an input of NAND gate 221. The output of NAND gate 197 is coupled over line 224 to an input of NAND gate 221. The output of NAND gate 221 is coupled over line 36 and is signal F1.

Referring to FIG. 11, signal DEL is coupled over line 163 to an input of NAND gate 227, 228 and 229. Signal $\overline{LQ1}$ is coupled over line 204 to an input of NAND gate 227. Signal $\overline{LQ2}$ is coupled over line 206 to an input of NAND gate 227 and 229. Signal LQ1 is coupled over line 174 to an input of NAND gates 228 and 229. Signal LQ2 is coupled over line 180 to an input of NAND gate 228. The output of NAND gate 227 is coupled over line 230 to an input of NAND gate 231. The output of NAND gate 228 is coupled over line 232 to an input of NAND gate 231. The output of NAND gate 231 is coupled over line 190 and is signal F2C. The output of NAND gate 229 is coupled over line 233 to an input of NAND gate 234. The output of NAND gate 234 is coupled over line 37 and is signal F2.

The logic circuitry in FIGS. 10 and 11 implement Table I as a function of signals DEL, LQ1 and LQ2 to provide control signal CTL, F1, F2 and F2C. One exception to Table I, however, is provided by logic (flip-flop 208) to set signal F1 from a logic one to a logic zero and signal CTL from a logic zero to a logic one at times $\overline{DEL}$, $\overline{LQ1}$ and LQ2 occur after the combination $\overline{DEL}$, $\overline{LQ1}$ and $\overline{LQ2}$. By setting F1 to zero and CTL to one when the prior condition had CTL a one provides for feeding elevation signal EL1 to antenna position control 34 which reduces tracking lag which would occur if filtered elevation signal EL1 was used. Filters 155, 167, 175, 142 and 143 may have a bandwidth of bandpass in the range from 0.2 to 2 HZ. Signal CTL on line 35 is coupled to antenna position control 34 to indicate the times when the elevation signal on line 33 is filtered $\overline{CTL}$ and unfiltered CTL. When CTL is a one, the elevation signal on line 33 is filtered by either filter 142 or 143.

A provision for adding an elevation correction signal is shown in FIG. 9 by adder 185. Under highly specular or severe multipath conditions, additional elevation correction is provided by elevation correction table 166. Elevation correction table 166 may have an elevation correction angle stored in a Table as a function of three values, namely, the difference in elevation signals on line 157, the filtered quadrature signal Q1 on line 168 and the filtered quadrature signal Q2 on line 176.

For the purely specular multipath case, the following functional relationships exist as shown by equations 5 through 8.

$$Q_1 = f_1(EL, A, \alpha) \tag{5}$$

$$Q_2 = f_2(EL, A, \alpha) \tag{6}$$

$$E_{21} = f_3(EL, A, \alpha) \tag{7}$$

$$C = f_4(EL, A, \alpha) \tag{8}$$

Where Q1 is a quadrature component of the signal along boresight reference line 45, Q2 is the quadrature component for target reflected signals along boresight reference line 46, $E_{21}$ is the difference in target elevation as measured by the two beams along boresight reference axes 45 and 46 and C is the elevation correction required to adjust elevation signal EL2 to the position of the target. In order to derive the required elevation correction, C, it is necessary to invert the functional relationships stated above in equations 5 through 8, so that the elevation correction C is a function of the value of Q1, Q2 and $E_{21}$ and shown in equation 9.

$$C = F_1(Q_1, Q_2, E_{21}) \tag{9}$$

By using equation 9, a table may be generated which may be stored in elevation correction table 166 for finding an elevation correction C as a function of Q1, Q2 and $E_{21}$.

The elevation correction angle C resulting from elevation correction table 166 may be created as follows. First determine the antenna pattern of antenna 11 when receiving target reflected signals along boresight reference line 46 for both the sum and difference signals. Next, determine the angular offset $\theta$, if unknown, between boresight reference lines 45 and 46. For example a target without multipath conditions may be boresighted along each boresight reference line 45 or 46 and the angular spacing between would be a measure of $\theta$. Now, analytically set out the geometry to model the expected multipath conditions, including an assumed specular reflection coefficient "A" target-to-image angle "EL", and phase angle "$\alpha$" shown in FIG. 14 between target signals and image signals as received by antenna 11. Next, vary the phase angle $\alpha$ and store the effective change in elevation of the target position. The difference in elevation signals on line 157 and the quadrature signals Q1 and Q2 after filtering on lines 168 and 176 may be computed relative to the stored effective change in elevation of the target position. It is understood that the target position is fixed relative to the reflecting surface and origin of the antenna pattern. Next, assign the stored effective change in elevation of the target position according to expected values of the difference in elevation signals EL1 and EL2 on line 157, filtered quadrature signal Q1 on line 168 and filtered quadrature signal Q2 on line 176.

In addition, target to image angle EL, reflection coefficient A and the phase angle $\alpha$ may be similarly derived and stored as a function of the elevation difference signal of elevation EL1 and EL2 on line 157 and filtered quadrature signals Q1 and Q2 on lines 168 and 176, respectively as part of elevation correction table 166. Therefore, by reference to a Table storing these values, the reflection coefficient A, target to image angle EL, and phase angle $\alpha$ may be determined from the table and coupled out on lines 194 through 196. Equations 10, 11 and 12 show the equations for elevation EL, reflection coefficient A and phase angle $\alpha$.

$$EL = F_2(Q_1, Q_2, E_{21}) \tag{10}$$

$$A = F_3(Q_1, Q_2, E_{21}) \tag{11}$$

$$\alpha = F_4(Q_1, Q_2, E_{21})$$

(12)

In equation 10, EL is the elevation angle between lines drawn from the center of the antenna 11 to the target and from the center of the antenna to the image of the target. Elevation angle EL may vary from 0 to twice the beam width of antenna 11. For example if the beamwidth of antenna 11 is 2° then EL may be expected to vary from 0° to 4°. In equation 11, the reflection coefficient A is the amount of power reflected by the reflecting surface causing multipath conditions such as the earth or water which may vary from 0 to 1 and typically is in the range from 0.2 to 0.5 over flat but rough terrain to unity over smooth water. In equation 12, $\alpha$ is the phase angle between the target and image signal as received by antenna 11 which may vary from 0° to 360°.

The means to produce distinct values of elevation EL, reflection coefficient A and phase angle $\alpha$ as shown by equations 10 through 12 are similar to those used to obtain the elevation correction C namely by computation or by empirical data which is stored in a look-up table. It is understood that target to image angle EL, reflection coefficient A and phase angle $\alpha$ are not connected back into signal evaluator 28 but rather are provided for external purposes to an external utilization device 29.

The typical effects from a target and an image is shown by the processed target reflected signals in FIGS. 12 through 14. For free space conditions where only target reflections are present, target sum signal $\Sigma_T$ shown by vector or phasor 239 in FIG. 12 and target difference signal $\Delta_T$ is shown by vector 238 when positive and by vector 237 when negative.

Conditions in which target reflected signals along boresight reference line 45 includes erroneous image signals from multipath reflections for the special case where $\alpha = 0$ is shown in FIG. 13. FIG. 14 demonstrates the erroneous target information from the resultant sum vector 244 as created by the target sum $\Sigma_T$ shown by vector 243 and image sum $\Sigma_I$ shown by vector 245, at angle $\alpha$ 246. The image sum $\Sigma_I$ signal is generally smaller than the target sum $\Sigma_T$ signal due to lossy reflecting surfaces. Similarly, a resultant difference vector 241 is formed by target difference $\Delta_T$ shown by vector 242 and image difference $\Delta_I$ shown by vector 240 also at angle $\alpha$, 246. It is generally true that the magnitude ratio of the image difference $\Delta_I$ shown by vector 240 to image sum $\Sigma_I$ shown by vector 245 will not be the same proportion as the target difference $\Delta_T$ shown by vector 242 to the target sum $\Sigma_T$ shown by vector 243. In conventional single monopulse tracking systems, the antenna is aimed to minimize in-phase component 247 of the resultant difference vector. Also, the presence of the resultant difference vector quadrature component 248 generally indicates the presence of image components in the received sum $\Sigma$ and difference $\Delta$ signals, except as in FIG. 13 when the image sum $\Sigma_I$ shown by vector 245 and image difference $\Delta_I$ shown by vector 240 lay in phase (0°) or exactly out of phase (180°) to the target sum $\Sigma_T$ shown by vector 243 and target difference $\Delta_T$ shown by vector 242, which produce resultant difference vectors 241 with no characteristic multipath quadrature component. The word "vector" is used to describe a periodic time varying signal known as a phasor. A phasor is a periodic time varying signal which can be represented by a complex number having real or imaginary components or magnitude and phase. In other words, the off boresight angle is determined by the ratio $\Delta/\Sigma$ which is a function of the target-to-image phase angle $\alpha$, 246, FIG. 14. When $\alpha$ is 0 or any multiple of $2\pi$, and A = 1 (perfect reflection) FIG. 13, the antenna 11 will point to the geometric centroid between target and image. When $\alpha = \pi + 2\pi N$ (N=0, 1, 2, 3 ...) target and image are 180° out of phase and antenna 11 will be driven to a point above the true target elevation. This is still the centroid location but it is a more general phasor centroid. Antenna 11 is prevented from pointing straight up only by the decrease in the relative image signal strength, a result of reduced antenna gain as the antenna elevation increases.

A secondary channel along a boresight reference line 46 will receive a different set of signals, either without quadrature components, FIG. 13, or, more likely, with quadrature component 248, FIG. 14, wherein the multipath conditions and target position that may not be accurately measured by a single radar beam will, according to the system and method of the present invention, be more accurately measured.

Since the primary and secondary beams are disposed at an angle relative to each other which is typically about 60% of a beam width, and the primary beam has its boresight normally on the target, the in-phase component of the secondary monopulse is typically not nulled since it is the primary beam that generally controls the positioning of the antenna.

The secondary beam along boresight reference line 46 is displaced upward relative to the primary beam along boresight reference line 45 and consequently does not illuminate the specular surface (or ground for elevation tracking) as strongly as does the primary beam, which means that the image components in FIG. 14, $\Sigma_I$, 245 and $\Delta_I$, 240 components will be smaller for the secondary monopulse than for the primary monopulse, relative to the $\Sigma_T$, 243 and $\Delta_T$, 242 components. Therefore, the secondary monopulse resultant difference $\Delta_R$, 241 will be more nearly in phase with resultant sum, $\Sigma_R$, 244 thus approaching a free space environment, and hence a more reliable measurement. When multipath conditions are indicated by signal evaluator 28.

The information from the secondary beam off-bore measurement is used to provide a better estimate of true target position and under highly specular conditions the correction term provided by elevation correction table 166 is used to further refine the estimate. Under highly specular conditions (where there is a danger of the primary beam track transferring to the image) the primary beam can be pointed at this best estimate of target position. In this case, off-bore processing will be performed with both primary and secondary beams.

FIG. 15 shows one example of multipath conditions. A military tank 251 carries a radar 10 having an antenna 11. Antenna 11 is directed along its boresight reference line 45 at target 252, a helicopter. The helicopter may be in flight or hovering above the ground.

An image 253 of the target 252 may appear below the horizon or ground level because image signals arrive from along path 255. A reflecting surface 254 such as water or ground reflects signals off the ground shown in FIG. 15 by paths 255 and 256. Antenna 11 will transmit energy direct to the target along path 257 or along paths 255 and 256 depending upon the orientation of boresight reference lines 45 and 46 and the beam width.

At least four unique round-trip paths are possible in multipath conditions. A first round-trip signal path may be along path 257 to the target 252 and back along path 257. A second round-trip signal path may be along path 257 to the target 252 and back along paths 256 and 255. The elevation angle EL can be seen in FIG. 15 between paths 255 and 257.

What is claimed is:

1. A method for determining the presence of multipath conditions when tracking a target with a radar comprising the steps of:
   transmitting a first signal with an antenna having a first predetermined beamwidth and directed in a first direction towards said target;
   receiving target reflected first signals with said antenna directed in said first direction;
   generating a first elevation signal from said target reflected first signals;
   transmitting a second signal with an antenna having a second predetermined beamwidth and directed in a second direction towards said target, said second direction being angularly offset in elevation from said first direction by a predetermined angle;
   receiving target reflected second signals with said antenna directed in said second direction;
   generating a second elevation signal from said target reflected second signals;
   subtracting said first and second elevation signals to provide an elevation difference signal; and
   generating a first signal indicative of multipath conditions at times said elevation difference signal exceeds a first predetermined value.

2. The method of claim 1 further including the steps of:
   generating a first quadrature signal from said target reflected first signals; and
   generating a second signal indicative of multipath conditions at times said first quadrature signal exceeds a second predetermined value.

3. The method of claim 2 further including the step of:
   generating a second quadrature signal from said target reflected second signals; and
   generating a third signal indicative of multipath conditions at times said second quadrature signal exceeds a third predetermined value.

4. The method of claim 3 further including the step of:
   generating a fourth signal indicative of the severivity of the multipath condition in response to said first, second and third signals.

5. The method of claim 3 further including the steps of:
   addressing a memory having a plurality of predetermined stored constants with said first, second and third signals combined to form an address signal; and
   reading out a portion of said predetermined stored constants in response to said address signals to provide an indication of the severity of the multipath condition.

6. The method of claim 1 wherein said steps of transmitting said first and second signals includes transmitting with an antenna having first and second predetermined beamwidths of 50 milliradians.

7. The method of claim 1 wherein said steps of transmitting first and second signals includes transmitting with a monopulse antenna.

8. The method of claim 1 wherein said steps of receiving target reflected first and second signals includes the step of generating sum and difference signals.

9. The method of claim 8 wherein said step of generating a first elevation signal includes the step of generating in-phase and quadrature signals.

10. The method of claim 8 wherein said step of generating a second elevation signal includes the step of generating in-phase and quadrature signals.

11. The method of claim 1 wherein said step of transmitting a second signal in said second direction includes transmitting where said predetermined angle is substantially 60% of the angle of said second predetermined beamwidth.

12. Apparatus for determining the presence of multipath conditions when tracking a target with a radar comprising:
   means for transmitting a first signal including an antenna having a first predetermined beamwidth and directed in a first direction towards said target;
   means for receiving target reflected first signals with said antenna directed in said first direction;
   means for generating a first elevation signal from said target reflected first signals;
   means for transmitting a second signal including an antenna having a second predetermined beamwidth and directed in a second direction towards said target, said second direction being angularly offset in elevation from said first direction by a predetermined angle;
   means for receiving target reflected second signals with said antenna directed in said second direction;
   means for generating a second elevation signal from said target reflected second signals;
   means for subtracting said first and second elevation signals to provide an elevation difference signal; and
   means for generating a first signal indicative of multipath conditions at times said elevation difference signal exceeds a first predetermined value.

13. The apparatus of claim 12 further including:
   means for generating a first quadrature signal from said target reflected first signals; and
   means for generating a second signal indicative of multipath conditions at times said first quadrature signal exceeds a second predetermined value.

14. The apparatus of claim 13 further including:
   means for generating a second quadrature signal from said target reflected second signals; and
   means for generating a third signal indicative of multipath conditions at times said second quadrature signal exceeds a third predetermined value.

15. The apparatus of claim 14 further including:
   means for generating a fourth signal indicative of the severity of the multipath condition in response to said first, second and third signals.

16. The apparatus of claim 14 further including:
   a memory having a plurality of predetermined constants stored as a function of said first, second and third signals and
   for providing a portion of said predetermined constants in response to said first, second and third signals to provide at least a fourth signal indicative of the severity of the multipath condition.

17. The apparatus of claim 12 wherein said antenna has a first predetermined beamwidth of 50 milliradians.

18. The apparatus of claim 12 wherein said antenna has a second predetermined beamwidth of 50 milliradians.

19. The apparatus of claim 12 wherein said antenna is a monopulse antenna having at least a sum and difference channel.

20. The apparatus of claim 12 wherein said antenna has a plurality of feeds to provide said first predetermined beamwidth at first times and said second predetermined beamwidth angularly offset by said predetermined angle at second times.

21. The apparatus of claim 20 wherein said antenna includes means for generating sum and difference signals from target reflected first and second signals.

22. The apparatus of claim 12 wherein said means for generating a first elevation signal includes means for generating in-phase and quadrature signals.

23. The apparatus of claim 12 wherein said means for generating a second elevation signal includes means for generating in-phase and quadrature signals.

24. The apparatus of claim 12 wherein said means for transmitting a second signal in said second direction includes means for transmitting at said predetermined angle which is substantially 60% of the angle of said second predetermined beamwidth.

25. A method for determining the presence of multipath conditions when tracking a target with a radar, comprising the steps of:
   collecting radar echoes at two antenna positions spaced apart by a predetermined angle in elevation relative to one another;
   processing said radar echoes at said two antenna positions to generate at least an in-phase angle error signal at said antenna positions;
   converting said in-phase signals to target elevation measurements;
   detecting the difference between said target elevation measurements; and
   generating a first signal when said difference exceeds a first predetermined value to indicate a multipath condition.

26. The method of claim 25 wherein one of said antenna positions is called the first antenna position having its beam axis normally on a target and the other of said antenna positions is called the second antenna position having its beam axis normally off of the target, further comprising the steps of:
   processing said radar echoes at said first antenna position to generate a quadrature angle error signal at said first antenna position; and
   generating a second signal indicative of multipath conditions at times said quadrature angle error signal at said first antenna position exceeds a second predetermined value.

27. A system for target information processing in a multipath environment comprising:
   antenna means positioned to detect radar echoes in two beams angularly spaced a predetermined distance;
   a radar receiving channel for each of said antenna means;
   means for processing the radar echoes to generate at least in-phase signals for each channel;
   means for converting said in-phase signals to elevation measurements;
   means for detecting the difference between said elevation measurements to provide a difference signal; and
   means for selecting one of said radar receiving channels in accordance with said difference signal.

28. A method for determining multiscattering conditions while tracking with a monopulse radar comprising the steps of:
   directing the boresight of an antenna at the target;
   radiating pulses toward the target;
   receiving target reflected pulses;
   generating a first elevation error signal with respect to the position of said antenna boresight;
   directing the boresight of said antenna at a predetermined angle above the target, said predetermined angle being small enough to enable illumination of the target by the main beam;
   radiating pulses toward the target;
   receiving target reflected pulses;
   generating a second elevation error signal with respect to the position of said antenna boresight; and
   comparing the difference between said first and second elevation signals to a predetermined value to generate a signal indicative of a multipath condition when said difference exceeds said predetermined value.

29. A method of determining the position of a target comprising the steps of:
   transmitting first and second radar signals that are offset angularly in elevation from each other by a predetermined angle;
   generating a first elevation signal and a second elevation signal in response to target reflected signals of said first and second transmitted signals, respectively;
   subtracting one of said first and second elevation signals from the other to provide an elevation difference signal;
   comparing said difference signal to a first predetermined value to
   generate a first signal at times said elevation difference signal exceeds said first predetermined value;
   generating a first quadrature signal and a second quadrature signal in response to target reflected signals of said first and second transmitted signals, respectively;
   comparing said first quadrature signal with a second predetermined value and said second quadrature signal with a third predetermined value to
   generate a second signal at times said first quadrature signal exceeds said second predetermined value and a third signal at times said second quadrature signal exceeds said third predetermined value; and
   selecting one of said first and second elevation signals as the position of said target in response to said first, second and third signals.

30. The method of claim 29 further including the step of filtering the signal to be selected.

31. The method of claim 29 further including the steps of:
   generating at first times a table of target to image angle values in response to the values of said elevation difference signal, first quadrature signal and said second quadrature signal and
   selecting at second times a target to image angle value from said table in response to the value of said elevation difference signal, first quadrature signal and said second quadrature signal; and
   coupling said selected target to image angle value to an output terminal.

32. The method of claim 29 further including the steps of:

generating at first times a table of reflection coefficient values in response to the values of said elevation difference signal, first quadrature signal and said second quadrature signal and selecting at second times a reflection coefficient value from said table in response to the value of said elevation difference signal, first quadrature signal and said second quadrature signal; and coupling said selected reflection coefficient value to an output terminal.

33. The method of claim 29 further including the steps of:

generating at first times a table of phase angle values in response to the values of said elevation difference signal, first quadrature signal and said second quadrature signal and selecting at second times a phase angle value from said table in response to the value of said elevation difference signal, first quadrature signal and said second quadrature signal; and coupling said selected phase angle value to an output terminal.

34. A method of determining the position of a target comprising the steps of:

transmitting first and second radar signals that are offset angularly in elevation from each other by a predetermined angle;

generating a first elevation signal and a second elevation signal in response to target reflected signals of said first and second transmitted signals, respectively;

subtracting one of said first and second elevation signals from the other to provide an elevation difference signal;

comparing said difference signal to a first predetermined value to generate a first signal at times said elevation difference signal exceeds said first predetermined value;

generating a first quadrature signal and a second quadrature signal in response to target reflected signals of said first and second transmitted signals, respectively;

comparing said first quadrature signal with a second predetermined value and said second quadrature signal with a third predetermined value to generate a second signal at times said first quadrature signal exceeds said second predetermined value and a third signal at times said second quadrature signal exceeds said third predetermined value;

generating at first times a table of elevation correction values in response to the values of said elevation difference signal, first quadrature signal and said second quadrature signal and selecting at second times an elevation correction value from said table in response to the value of said elevation difference signal, first quadrature signal and said second quadrature signal;

adding said selected elevation correction value to said second elevation signal to form a third elevation signal; and selecting one of said first, second or third elevation signals as the position of said target in response to said first, second and third signals.

35. The method of claim 29 or 34 further including the step of directing in elevation said first radar signals in response to said selected elevation signal and wherein said second radar signals are offset angularly in elevation above said first radar signals.

36. The method of claim 29 or 34 further including the steps of:

directing in elevation said first radar signals in response to said first elevation signal and wherein said second radar signals are offset angularly in elevation above said first radar signals.

37. The method of claims 34, 31, 32 or 33 wherein said step of generating a table includes storing a plurality of predetermined constants in a memory.

38. The method of claims 34, 31, 32 or 33 wherein said step of generating a table includes the steps of storing a plurality of predetermined constants in a memory and wherein said step of selecting includes the step of:

addressing said memory with said elevation difference signal, said first and second quadrature signals to read out from said memory a portion of said predetermined constants.

39. Apparatus for determining the position of a target comprising:

means for transmitting first and second radar signals that are offset angularly in elevation from each other by a predetermined angle;

means for generating a first elevation signal and a second elevation signal in response to target reflected signals of said first and second transmitted signals, respectively;

means for subtracting one of said first and second elevation signals from the other to provide an elevation difference signal;

means for generating a first signal at times said elevation difference signal exceeds a first predetermined value;

means for generating a first quadrature signal and a second quadrature signal in response to target reflected signals of said first and second transmitted signals, respectively;

means for generating a second signal at times said first quadrature signal exceeds a second predetermined value and a third signal at times said second quadrature signal exceeds a third predetermined value; and means for selecting one of said first and second elevation signals as the position of said target in response to said first, second and third signals.

40. The apparatus of claim 39 wherein said means for transmitting includes an antenna having a beamwidth of 50 milliradians.

41. The apparatus of claim 39 wherein said means for transmitting includes an antenna having at least a sum and difference channel.

42. The apparatus of claim 39 wherein said means for transmitting includes an antenna having a plurality of feeds to provide a first radiant beam having a boresight reference axis and a first predetermined beamwidth at first times and a second radiant beam having a boresight reference axis and a second predetermined beamwidth angularly offset in elevation by said predetermined angle at second times.

43. The apparatus of claim 42 wherein said antenna includes means for generating sum and difference signals from target reflected signals of said first and second transmitted signals.

44. The apparatus of claim 39 wherein said means for generating a first elevation signal and a second elevation signal includes means for generating in-phase and quadrature signals.

45. The apparatus of claim 39 wherein said means for transmitting said second radar signal includes means for transmitting at said predetermined angle which is substantially 60% of the beamwidth of said second radar signal.

46. The apparatus of claim 39 further including means for filtering the signal to be selected.

47. The apparatus of claim 39 further including:
means for generating at first times a table of elevation correction values in response to the values of said elevation difference signal, first quadrature signal and said second quadrature signal and
for selecting at second times an elevation correction value from said table in response to the value of said elevation difference signal, first quadrature signal and said second quadrature signal;
means for adding said selected elevation correction value to said second elevation signal to form a third elevation signal; and
means for selecting one of said first, second or third elevation signals as the position of said target in response to said first, second and third signals.

48. The apparatus of claim 39 further including:
means for generating a table of target to image angle values in response to the values of said elevation difference signal, first quadrature signal and said second quadrature signal and
for selecting a target to image angle value from said table in response to the value of said elevation difference signal, first quadrature signal and said second quadrature signal; and
means for coupling said selected target to image angle value to an output terminal.

49. The apparatus of claim 39 further including:
means for generating a table of reflection coefficient values in response to the values of said elevation difference signal, first quadrature signal and said second quadrature signal and
for selecting a reflection coefficient value from said table in response to the value of said elevation difference signal, first quadrature signal and said second quadrature signal; and
means for coupling said selected reflection coefficient value to an output terminal.

50. The apparatus of claim 39 further including:
means for generating a table of phase angle values in response to the values of said elevation difference signal, first quadrature signal and said second quadrature signal and
for selecting a phase angle value from said table in response to the value of said elevation difference signal, first quadrature signal and said second quadrature signal; and
means for coupling said selected phase angle value to an output terminal.

51. Apparatus for determining the position of a target comprising:
means for transmitting first and second radar signals that are offset angularly in elevation from each other by a predetermined angle;
means for generating a first elevation signal and a second elevation signal in response to target reflected signals of said first and second transmitted signals, respectively;
means for subtracting one of said first and second elevation signals from the other to provide an elevation difference signal;
means for generating a first signal at times said elevation difference signal exceeds a first predetermined value;
means for generating a first quadrature signal and a second quadrature signal in response to target reflected signals of said first and second transmitted signals, respectively;
means for generating a second signal at times said first quadrature signal exceeds a second predetermined value and a third signal at times said second quadrature signal exceeds a third predetermined value;
means for generating at first times a table of elevation correction values in response to the values of said elevation difference signal, first quadrature signal and said second quadrature signal and
for selecting at second times an elevation correction value from said table in response to the value of said elevation difference signal, first quadrature signal and said second quadrature signal;
means for adding said selected elevation correction value to said second elevation signal to form a third elevation signal; and
means for selecting one of said first, second or third elevation signals as the position of said target in response to said first, second and third signals.

52. The apparatus of claim 39 or 51 further including means for directing in elevation said first radar signals in response to said selected elevation signal and wherein said second radar signals are offset angularly in elevation above said first radar signals.

53. The apparatus of claims 51, 48, 49 or 50 wherein said means for generating a table includes means for storing a plurality of predetermined constants in a memory.

54. The apparatus of claims 51, 48, 49 or 50 wherein said means for generating a table includes means for storing a plurality of predetermined constants in a memory and wherein said means for selecting includes:
said memory coupled to receive said elevation difference signal, said first and second quadrature signals to address said memory to read
out from said memory a portion of said predetermined constants.

* * * * *